Jan. 9, 1940.  A. C. DURDIN, JR  2,186,371
APPARATUS FOR AND METHOD OF REMOVING SUPERNATANT
MATTER FROM SEWAGE AND OTHER LIQUIDS
Filed Aug. 12, 1937  2 Sheets-Sheet 1

INVENTOR.
Augustus C. Durdin, Jr.
BY
ATTORNEY.

Patented Jan. 9, 1940

2,186,371

UNITED STATES PATENT OFFICE 2,186,371

APPARATUS FOR AND METHOD OF REMOVING SUPERNATANT MATTER FROM SEWAGE AND OTHER LIQUIDS

Augustus C. Durdin, Jr., Lincolnwood, Ill.

Application August 12, 1937, Serial No. 158,778

11 Claims. (Cl. 210—8)

This invention relates to apparatus for and method of removing supernatant matter from sewage and other liquids. In the modern treatment of sewage it is conducted from the sewers to a sewage treatment plant and run through aerating and settling tanks. Grease, oil and other supernatant material accompanies the sewage and it is desirable to remove as much of the supernatant material as is possible before the sewage reaches the settling tank. Desirably, in the treatment of sewage it is aerated before passing to the settling tank.

The principal object of this invention is to remove as much of the supernatant matter from the sewage as is possible before it passes to the settling tank by means that are automatic or partially automatic.

Another object is to preaerate the sewage before it passes to the first settling tank and to utilize the aerating means in removing the supernatant matter from the surface of the sewage.

Another object is to increase the settling rate in the settling tank. Another object is to aerate the sewage whereby to cause oil, grease and other buoyant particles to rise to the surface, whereby they may be floated away from the tank contents.

In accordance with the present invention, the sewage is aerated, thereby causing the oil, grease and other buoyant matter to rise more rapidly and the scum and other supernatant matter is removed from the surface of the sewage as by agitating the surface portion thereof, thereby causing waves at its surface which proceed towards the walls of the tank and wash the supernatant matter over a weir whereby it is separated from the remainder of the sewage. The aeration and agitation of the sewage may be effected by any suitable means, and, in accordance with the present disclosure, an aerator is employed which lifts a column of the sewage above the surface thereof and throws it upon the surface of the sewage, thereby aerating the sewage and setting up waves that carry the supernatant matter over the weir.

Other objects and advantages will appear in the course of this specification and, with all of said objects in view, this invention consists in the method of removing scum and other supernatant material from sewage and other liquids by agitating the surface portion of the liquid to cause waves that carry away the scum and other supernatant matter to a place which separates it from the remainder of the liquid.

The invention further consists in a method of removing scum and other supernatant material from sewage and other liquids wherein an aerator is employed for aerating the liquid to cause oil, grease and other buoyant matter to rise to the surface and agitating the surface portion of the sewage to case waves, whereby the scum and other supernatant matter is carried away and separated from the liquid.

The invention further consists in apparatus for practicing the above described method.

The invention further consists in means for maintaining a level of the sewage whereby the most efficient action thereon may be obtained.

Another object is to provide means for collecting the scum and other matter removed from the sewage in accordance with the herein described method.

The invention further consists in the several novel features of construction, arrangement and combination of parts hereinafter fully set forth and claimed.

One embodiment of the invention is illustrated in the accompanying drawings in which:

Fig. 2 is a detail, vertical cross section taken on the line 2—2 of Fig. 1.

Fig. 3 is a detail, vertical cross section taken on the line 3—3 of Fig. 1.

Fig. 4 is a fragmental plan of the aerating tank and grease-collecting tanks.

Fig. 5 is a fragmental, perspective view of a modified form of spillway.

Fig. 6 is a fragmental, perspective view of another modified form of spillway.

Figure 1:
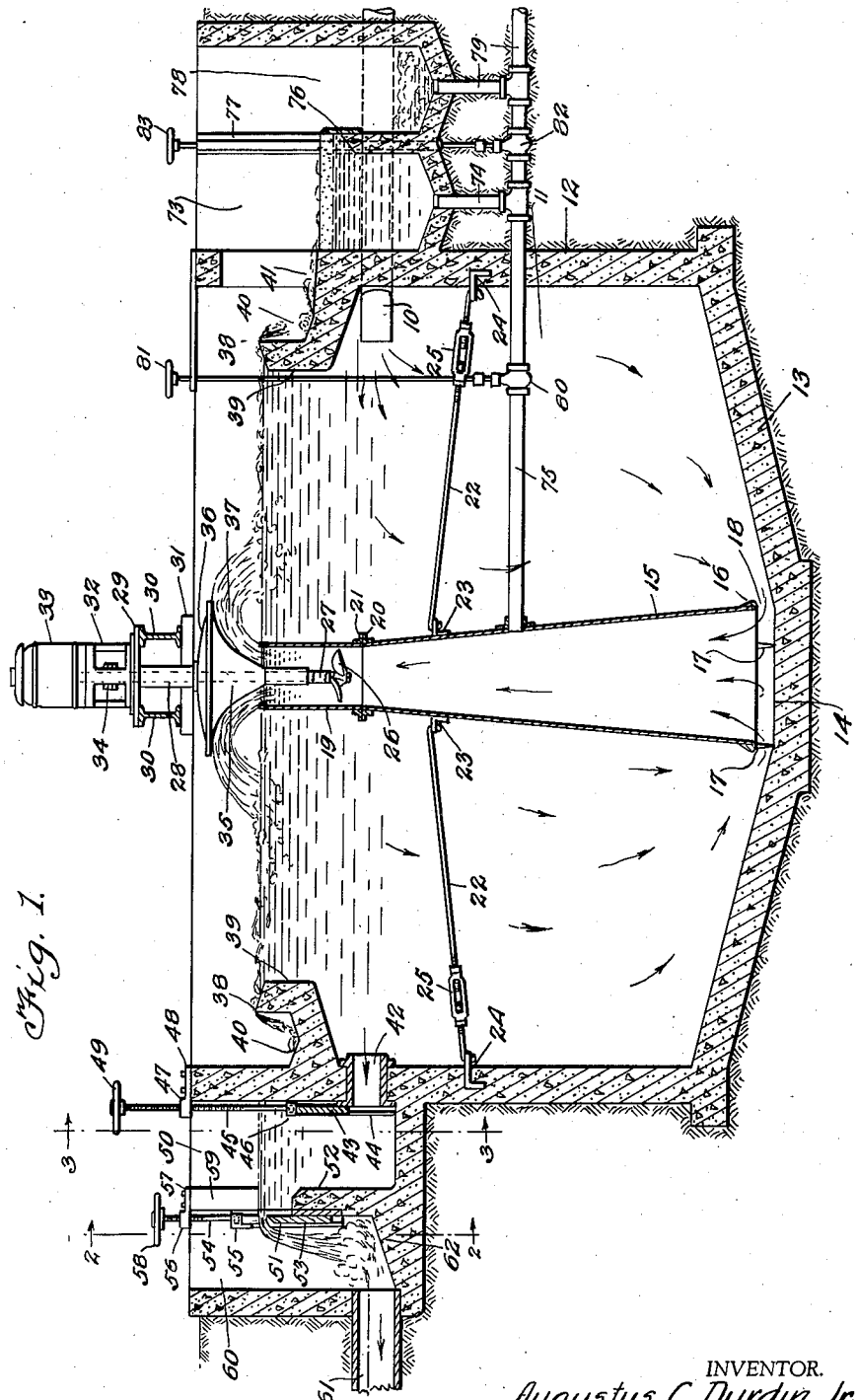
Fig. 1 is a vertical cross section through the apparatus.

Referring to said drawings, and first to Figs. 1 to 4 inclusive, which are merely illustrative of one embodiment of the invention, the reference character 11 designates a tank which, if desired, may comprise the preaerating tank of the system, into which the sewage is conducted by an influent conduit 10 and from which the effluent is conducted by an effluent conduit 42, 61. Desirably, the influent conduit 10 enters the tank below the water line so that any grease and other buoyant matter entering the tank will be thoroughly mixed with the tank contents which are being aerated, whereby these buoyant particles will rise to the surface of the tank contents where they may be separated from the remainder of the tank contents. The tank 11 may be of any desirable construction, preferably of concrete, and comprises a side wall 12, either round, square or any other desirable shape, and a flat or hopperlike bottom 13.

In the embodiment of the invention illustrated, suitable means are provided for agitating the surface portion of the tank contents so as to produce waves upon the surface thereof and the means here shown comprises aerating means which raises the tank contents from its bottom and throws them upon the surface thereof.

The aerating means shown comprises a draft tube 15, the lower end of which is spaced slightly above the flat portion 14 of the bottom of the tank by short legs 17 which project down from a reenforcing ring 16 secured to the lower end of the draft tube. Between the lower end of the draft tube 15 and the bottom portion 14 is an annular passage 18 through which the tank contents flow from the tank into the draft tube. Desirably, the draft tube tapers upwardly to a throat section 19 of desired diameter for the tank capacity. The throat section 19 and tapered draft tube 15 may be connected together by angle irons 20, 21, secured upon the meeting edges of the throat section and tapered draft tube and bolted or otherwise fastened together.

The draft tube is maintained in upright position by the rods 22 attached to brackets 23 on the draft tube and to eyes 24 anchored in the side walls 12 of the tank. Turn buckles 25 provide means for tightening up the tie rods whereby to hold the draft tube in a true vertical position.

An aerator of any suitable design may be provided for aerating the tank contents. As shown, the aerator comprises a propeller 26 located in the throat section of the draft tube and mounted on an upright drive shaft 27 rotatively mounted in a hanger pipe 28 which is attached to an adjustable bed plate 29 carried by I beams 30 which span the tank and are secured at their ends to abutments on the tank, one of which is seen at 31 in Fig. 1.

A motor pedestal 32 is mounted on the bed plate 29 and supports a motor 33 which is the prime mover for the propeller 26. A shaft coupling 34 connects the propeller shaft with the motor shaft.

A diffuser cone, having an inverted conical member 35 and crowned top 36, is carried by the hanger pipe 28 and is adjustable vertically so that the diffuser cone may be set at any desired elevation with respect to the upwardly moving column of liquid whereby to readily change the course of the column of liquid from an upward direction to an outward horizontal direction whereby the liquid is thrown outward in an annular fan shape as at 37, so that the diffused liquid falls back upon the surface of the tank contents, thereby aerating the same and agitating the surface port n and producing waves upon its surface which roll towards the side walls of the tank.

In the operation of the aerator, the tank contents are caused to flow downwards in the tank to the lower end of the draft tube, thence upward through the tube, from which the column of the liquid is thrown upward and outward and falls upon the surface of the tank contents, thereby creating a continuous circulation of the sewage in the general direction indicated by the arrows in the tank. Owing to the aerated condition in the tank contents, oil, grease and other buoyant matter entering the tank rise to the surface of the tank contents and accumulate upon the surface thereof in the form of scum and are carried along with the waves toward the walls of the tank.

A spillway or gutter 38 is provided in the tank adjacent its side walls, into which the waves wash the scum and other supernatant matter, and, desirably, the spillway comprises a vertical weir 39 which extends up from a shelf like bottom wall 40 that projects into the tank from the side walls or walls thereof and slopes downwards from a high point on the side of the tank opposite the one through which the influent conduit enters the tank, whereby the liquid, scum and other supernatant material washed into the spillway may flow towards the low side thereof, thereby draining away accumulated liquid, scum and other supernatant material. In accordance with one form of the invention, an outlet drain 41 is provided at the low side of the spillway, through which the contents of the spillway may discharge therefrom.

The level of the tank contents is maintained slightly below the upper edge of the spillway weir 39 so as to prevent the tank contents from flowing over the spillway weir 39, except when the waves are produced. The level may, however, be lowered considerably in cases where the waves produced are relatively high, thus preventing the tank contents from flowing into the spillway but permitting the crests of the waves and the scum and other supernatant matter to be flowed over the top of the weir. Desirably, the upper edge of the spillway weir inclines upward slightly so as to prevent as much liquid from passing over the weir as is possible without interfering with the passing of the scum and supernatant matter thereover.

The inflow varies considerably and means are provided for maintaining the level of the tank contents at the required level and the means shown comprises regulating chambers 50, 60 and an adjustable weir 51. The effluent conduit section 42 discharges into the chamber 50, and the effluent conduit 61 leads from the chamber 60 to a settling tank or other place. The chambers 50, 60 are separated by a cross wall 52, provided with an opening 59 therein, through which the effluent flows, the bottom of the opening 59 being located somewhat below the level of the tank contents. The vertically adjustable weir 51 is slidably guided in ways 53 secured to the walls 52, and provides means for regulating the height of the overflow from the chamber 50 into the chamber 60. The weir is carried by threaded stems 54, swiveled in swivel blocks 55, secured to the weir 51, and threadedly mounted in nuts 56 formed on anchor straps 57 that are fastened to the top of the cross wall 52. Handwheels 58 secured upon the upper ends of the threaded stems provide means for manipulating the stems. By turning the handwheels to the proper direction, the weir may be raised or lowered to regulate the level of the tank contents. Desirably, the bottom of the chamber 60 slopes towards the bottom of the effluent conduit 61, as is seen at 62.

For the purpose of washing out the spillway, the level of the tank contents may be raised above the weir 39, and this may be accomplished by shutting off the discharge of the liquid from the tank so that the incoming sewage may raise the liquid level enough to overflow the weir 39. As shown, a shut-off gate 43 is provided at the end of the effluent section 42, which gate is guided in ways 44 fastened to the tank wall 12. A threaded stew 45, threadedly mounted in a nut 47, formed on a hanger plate 48, carried by the wall 12, is connected to the shut-off gate 43 by a swivel block 46, and provides means for opening and closing the gate. A handwheel 49 on the upper end of the threaded stem provides means for manipulating the same.

The weir 51 establishes the level of the water in the part 50 of the regulating chamber and also in the tank 11. This level should be maintained at about the top of or slightly below the top of the spillway weir 39 so that liquid normally will not spill over into the spillway, but any scum, grease or other supernatant matter liberated during the aerating process will collect on the surface of the liquid and will be gradually washed over the spillway weir into the spillway.

The supernatant matter draining from the spillway may be conducted away by any desirable means. When considerable heavier liquid, besides the supernatant matter, is to be drained away from the spillway, it is desirable to return the heavier liquid to the aerating tank. For this purpose a collection chamber 73 is provided adjacent the drain 41 into which the supernatant matter and heavier liquid discharge. The collection chamber is provided with an overflow opening controlled by a weir 76, over which the accumulated scum, grease and other supernatant material overflows into a grease chamber 78, from which it may be conducted to a digestion tank or other place by a pipe 79.

For returning the heavier liquids back to the aerating tank, a lower pressure head is maintained in the collection chamber 73 than in the aerating tank. This is accomplished by leading a return pipe 74, 75 from the bottom of the collection tank 73 to the draft tube 15. During the operation of the aerator, the pressure below the propeller 26 is reduced considerably, thereby lowering the pressure head in the collection chamber somewhat below that in the aerating tank, permitting some of the heavier liquids to return to the draft tube.

Desirably, the pipes 79, 74 are connected and valve 82 is interposed in the pipe connection, which valve is operated from a handwheel 82 at the top of the structure. A valve 80 may be interposed in the return pipe 75 and is operated from a handwheel 81 at the top of the structure. Normally, the valve 80 is open and the valve 82 is closed. These valves provide means whereby the grease chamber 78 may be pumped out through the pipe 79 when the valve 82 is closed and by closing the valve 80 and opening the valve 82, the collection chamber 73 may be pumped out. When pumped out, the chambers may be washed out to remove any matter that may have collected on the walls and bottoms of the chambers. The valve 80 also regulates the flow back through the return pipe 74, 75.

In the modified form of spillway shown in Fig. 5, the weir 63 has a series of abutments 64 on its upper edge that form tapering passages 66 between them, having wide throats 65 and constricted outlets 66, with sloping bottoms 67 if desired. The waves collect scum and grease particles in the wide throats and, in entering the tapering passages, the waves build up velocity to wash the floating matter over the weir into the trough 68 of the spillway.

In the modified form of spillway, shown in Fig. 6, the upper edge of the weir 69 is serrated, thereby forming spaced transverse ridges 70 and troughs 71, that slope upward from the interior of the tank. With this form of spillway the waves will follow directed courses instead of spreading out on a plane surface to leave the scum and greases.

The bottom 72 of the spillway contains drain openings 73 for the escape of the heavier liquids and the scum and grease may be scraped out of the spillway or removed in any other suitable means.

In the operation of the apparatus illustrated, the aerator circulates the tank contents down and then up through the draft tube and discharges it upon the surface of the tank contents, thereby causing waves upon its surface that proceed to the spillway and wash over it. Air is absorbed by the liquid while being thrown through the air and air is beaten into the liquid by the impact of the falling liquid on the tank contents. Grease and other buoyant matter rises through the circulating sewage to the surface, and the waves carry the floating matter to the spillway and wash it over the weir thereof into the gutter, from which the accumulated matter and liquids spilling over the weir are drained away or otherwise removed. When grease tanks are employed, the scum, grease and heavier liquids drain into the collection tank, the scum and grease overflowing into a grease tank, from which it may be pumped or drained to a digestion tank or otherwise, and the heavier liquids are returned to the tank through the return pipe.

The method of removing supernatant matter from sewage and other liquids is carried on, as follows:

A tank is filled with the sewage or other liquid to be treated, and the inflow and outflow may be continuous or intermittent as desired. Air is supplied to the sewage and the surface portion of the tank contents is agitated to produce waves which progress outwardly from the place where liquid is being acted upon by the agitating means, thereby carrying the floating material outward. Oil, grease and other buoyant matter are caused by the supply of air to rise to the surface and float thereon in the form of scum. The waves are intercepted by a weir over which the crests of the waves wash the supernatant matter into a spillway or gutter from which the heavier liquid is drained off. The scum, grease and other buoyant matter may be scraped out of the spillway or it may be drained therefrom along with the heavier liquid and collected in a tank wherein the buoyant matter is allowed to overflow into a grease tank or to any other place, and the heavier liquids are drained back into the tank.

A modified step in the method is to aerate the sewage, as by circulating the sewage down through a tank and then up through a conduit and dashing the upwardly moving stream upon the surface of the sewage, thereby causing waves thereon; permitting greases and other buoyant matter to rise and float on the surface, intercepting the waves and permitting them to wash the floating matter beyond the place of interception, and finally collecting the accumulated matter.

While I have illustrated the aerating and agitating means as a single unit, it is to be understood that the tank contents may be aerated by any approved means or the sewage may be aerated before entering the tank and the wavelike condition may be produced by separate agitating means. To obtain the best results the sewage must be aerated so that the oil, grease and other buoyant matter may rise faster than it would if it were not supplied with an abundance of air.

Furthermore, by aerating the sewage, any deficiency in oxygen therein for the further treatment of the sewage will be supplied by aerating it.

I claim as new and desire to secure by Letters Patent:

1. Apparatus for the treatment of sewage and other liquids comprising a tank, means for agitating the middle surface portion of the tank contents whereby to produce waves thereon, that progress outwardly in radial directions from said middle portion, and a spillway for separating supernatant matter from the tank contents, said spillway having a weir over which supernatant matter, floating on the tank contents is washed by the waves.

2. Apparatus for the treatment of sewage and other liquids comprising a tank, means for agitating the middle surface portion of the tank contents to produce waves thereon that progress outwardly therefrom in radial directions, and a spillway having a weir whose upper edge is disposed above the level of the tank contents and slopes upward therefrom, over which supernatant matter, floating on the tank contents, is washed by the waves.

3. Apparatus for the treatment of sewage and other liquids comprising a tank, an influent conduit discharging into the tank, and an effluent conduit opening from the tank below the level of the tank contents, means to agitate the middle surface portion of the tank contents whereby to produce waves thereon, that progress outwardly radially from said middle portion, a spillway having a weir over which supernatant matter is washed by the waves, and a vertically adjustable gate interposed in the effluent conduit for maintaining the level of the tank contents below the upper edge of the spillway weir.

4. Apparatus for the treatment of sewage and other liquids comprising a tank, an influent conduit discharging into the tank, and an effluent conduit opening from the tank below the level of the tank contents, means to agitate the middle surface portion of the tank contents whereby to produce waves thereon that progress outward radially in all directions from the middle portion, a spillway having a weir the top of which is located above the normal level of the tank contents and over which supernatant matter is washed by the waves, and a shut-off gate for closing the effluent conduit whereby to raise the level of the tank contents above the spillway weir.

5. Apparatus for the treatment of sewage and other liquids comprising a tank, aerating means therein having a draft tube and an aerator operating to circulate the tank contents down in the tank and up in the draft tube, and to discharge it from the draft tube upon the surface of the tank contents in radial directions, whereby to produce waves on the surface thereof that progress outwardly radially in all directions, a spillway having a weir over which supernatant matter, floating on the tank contents, is washed by the waves, said spillway having also a drain outlet discharging exteriorly of the tank, and an adjustable gate for maintaining the level of the tank contents below the top of the weir.

6. Apparatus for the treatment of sewage and other liquids comprising a tank, an aerator having means for discharging liquids in radial directions upon the surface portion of the tank contents to produce waves thereon that progress outwardly therefrom in radial directions, a spillway having a weir whose top is disposed above the level of the tank contents, there being an outlet drain from the spillway, a collection tank into which the spillway discharges accumulated buoyant matter and heavier liquids, and means permitting buoyant matter floating on the surface of the heavier liquid in the collection tank to float away therefrom, and means to return the heavier liquids from said collection tank to the first mentioned tank.

7. Apparatus for removing scum and other supernatant matter from sewage and other liquids, comprising a main tank, means for agitating the middle surface portion of the tank contents to produce waves thereon that progress outwardly therefrom in radial directions, a spillway having a weir over which supernatant matter, floating on the tank contents, is washed by the waves, a collection tank into which the spillway discharges accumulated supernatant matter and heavier liquids, said collection tank having an overflow outlet for supernatant matter, and means to lower the pressure head in the collection tank below that in the main tank, whereby the heavier liquids that accumulate in the collection tank are returned to the main tank.

8. The method of removing scum and other supernatant matter from sewage and other liquids, which consists in agitating the middle surface portion of a confined body of the liquid to produce waves on its surface that progress outwardly in all radial directions and carry supernatant matter with them holding back the tank contents below the waves and intercepting the waves while permitting the supernatant matter to be washed over the place where the waves are intercepted.

9. The method of removing supernatant matter from sewage and other liquids, which consists in aerating a confined body of the liquid, and discharging liquid upon the surface of said body of liquid in radial directions whereby to produce waves on the surface thereof that progress outwardly radially in all directions therefrom, intercepting the waves while permitting the supernatant matter to be washed into a spillway, draining the spillway of the supernatant matter and liquid entering the same, collecting the drained supernatant matter and liquid in a chamber, permitting the supernatant matter to overflow from the chamber, and returning the heavier liquids to the tank contents which are being aerated.

10. The method of removing scum and other supernatant matter from sewage which consists in aerating the sewage, whereby to cause buoyant matter to rise to the middle surface thereof, agitating the surface portion of the sewage to produce waves thereon that progress outwardly radially in all directions and intercepting the waves whereby the scum and other supernatant matter floating on the waves are washed therefrom.

11. Apparatus for the treatment of sewage and other liquids comprising a tank, an aerator having means to discharge liquid from the middle portion of the tank upon the surface portion of the tank contents whereby to produce waves thereon that progress outwardly radially in all directions, and a spillway having a weir formed on its upper edge with transverse passages between the tank interior and the spillway through which the waves wash supernatant matter.

AUGUSTUS C. DURDIN, Jr.